United States Patent
Laal Riahi et al.

(10) Patent No.: US 8,226,297 B2
(45) Date of Patent: Jul. 24, 2012

(54) UNIVERSAL JOINT BEARING WITH PLASTIC OUTER RING AND PROCEDURE FOR ITS PRODUCTION

(75) Inventors: Kamran Laal Riahi, Marburg (DE); August Stadlmayr, Desselbrunn (DE)

(73) Assignee: Federal-Mogul Deva GmbH, Stadtallendorf (DE)

( * ) Notice: Subject to any disclaimer, the term of this patent is extended or adjusted under 35 U.S.C. 154(b) by 749 days.

(21) Appl. No.: 11/855,512

(22) Filed: Sep. 14, 2007

(65) Prior Publication Data
US 2008/0161117 A1  Jul. 3, 2008

(30) Foreign Application Priority Data

Sep. 14, 2006 (DE) .......................... 10 2006 042 999
Sep. 14, 2006 (DE) .......................... 10 2006 043 065
Feb. 15, 2007 (DE) .......................... 10 2007 008 584

(51) Int. Cl.
*F16C 33/20* (2006.01)
*F16C 23/02* (2006.01)

(52) U.S. Cl. ........ 384/300; 384/192; 384/206; 384/297; 384/625; 384/908

(58) Field of Classification Search .................. 384/192, 384/206, 202, 208, 276, 297, 907, 911, 300, 384/625, 908; 29/898.045; 428/359–362, 428/364, 377; 57/252–257; 442/483, 415
See application file for complete search history.

(56) References Cited

U.S. PATENT DOCUMENTS

| | | | | |
|---|---|---|---|---|
| 1,923,601 A | * | 8/1933 | Weaver .......................... | 403/133 |
| 2,787,048 A | * | 4/1957 | Heim ...................... | 29/898.045 |
| 3,179,477 A | * | 4/1965 | Carter ........................... | 384/208 |
| 3,250,554 A | * | 5/1966 | Roode .......................... | 403/139 |
| 3,266,123 A | * | 8/1966 | McCloskey .............. | 29/898.047 |
| 3,562,885 A | * | 2/1971 | McCloskey .............. | 29/898.047 |
| 3,582,166 A | * | 6/1971 | Reising ........................ | 384/213 |
| 3,623,781 A | * | 11/1971 | Roos ............................. | 384/206 |
| 3,741,855 A | * | 6/1973 | Harrison et al. .............. | 384/911 |
| 3,776,409 A | * | 12/1973 | Pearson .................... | 220/62.19 |
| 3,870,589 A | * | 3/1975 | Shobert ........................ | 384/300 |
| 3,932,008 A | * | 1/1976 | McCloskey et al. .......... | 384/300 |
| 3,950,599 A | * | 4/1976 | Board, Jr. ........................ | 442/40 |
| 4,084,863 A | * | 4/1978 | Capelli ........................ | 384/300 |

(Continued)

FOREIGN PATENT DOCUMENTS

DE  84 00 958.6   4/1984

(Continued)

*Primary Examiner* — Marcus Charles

(74) *Attorney, Agent, or Firm* — Robert L. Stearns; Dickinson Wright, PLLC

(57) ABSTRACT

An outer race for a rocker bearing includes an internal sliding layer and an external support layer, wherein the sliding layer and the bearing layer are formed from a wound composite fiber material. The outer race is identified by exactly one parting line. A rocker bearing with such an outer race and a method for its production is also provided, in which a sliding layer and a support layer of synthetic resin impregnated fibers are wound in succession onto a winding mandrel, and outer races are formed after setting on the winding body thus produced. The sliding layer and the support layer are wound onto a cylindrical winding mandrel, and the outer race is provided with exactly one parting line opening it, and sliding layer material on its inside is removed to such an extent that a partially spherical contour is obtained for receiving a complementary inner race.

10 Claims, 5 Drawing Sheets

U.S. PATENT DOCUMENTS

Figure 1:
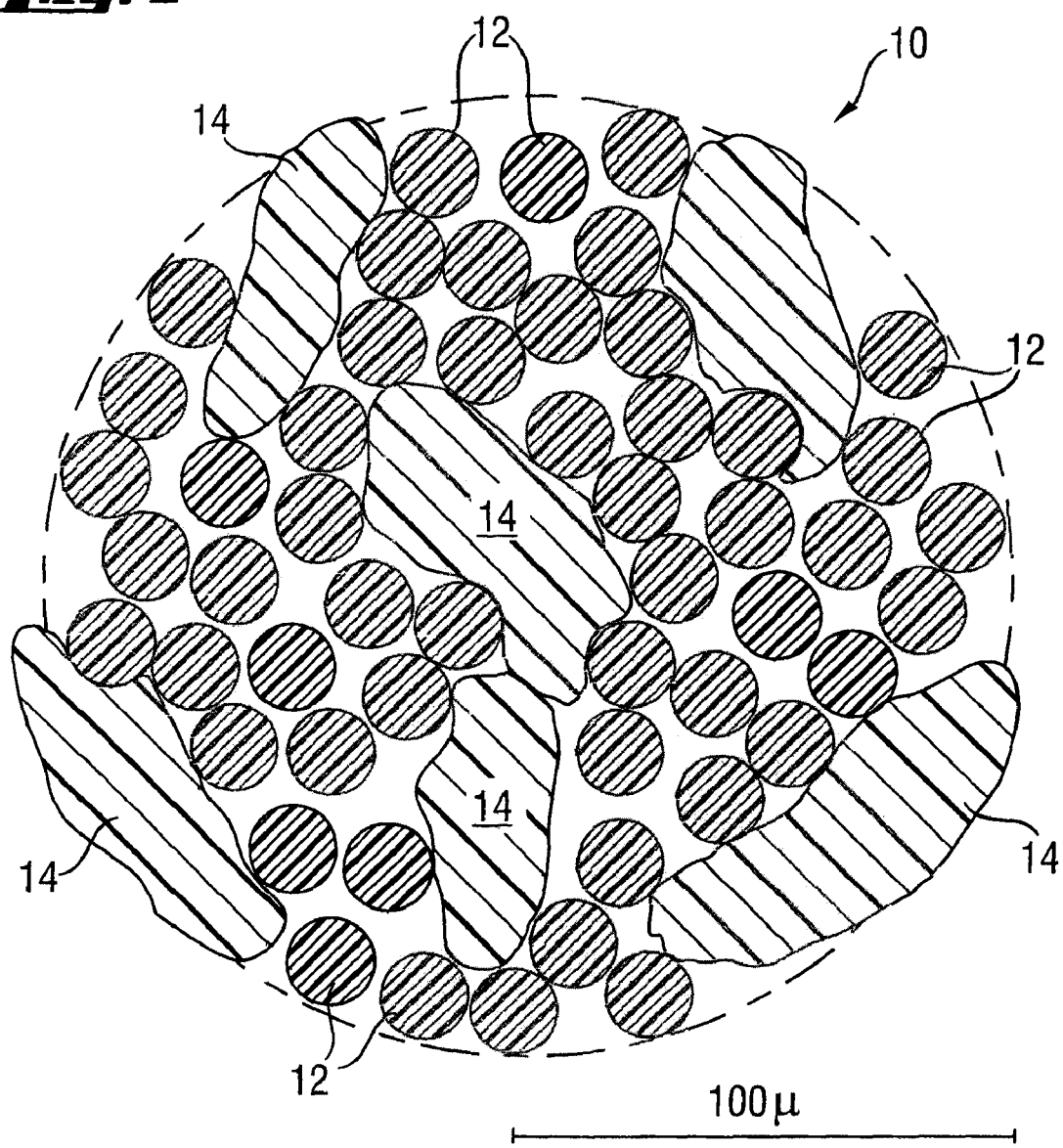

| | | | |
|---|---|---|---|
| 4,144,626 A * | 3/1979 | McEowen | 29/898.051 |
| 4,277,118 A * | 7/1981 | McCloskey | 384/300 |
| 4,323,525 A * | 4/1982 | Bornat | 264/441 |
| 4,345,414 A * | 8/1982 | Bornat et al. | 264/235 |
| 4,358,167 A * | 11/1982 | Magazian et al. | 384/322 |
| 4,440,835 A * | 4/1984 | Vignaud | 429/522 |
| 4,866,155 A * | 9/1989 | Mueller et al. | 528/191 |
| 4,867,889 A * | 9/1989 | Jacobson | 508/106 |
| 4,878,908 A * | 11/1989 | Martin et al. | 623/1.54 |
| 5,265,965 A * | 11/1993 | Harris et al. | 384/208 |
| 5,370,926 A * | 12/1994 | Hopper | 442/307 |
| 6,317,292 B1 * | 11/2001 | Thomas et al. | 360/133 |
| 6,860,638 B2 * | 3/2005 | Fish | 384/300 |
| 2004/0022465 A1 * | 2/2004 | Fish | 384/192 |
| 2004/0198127 A1 * | 10/2004 | Yamamoto et al. | 442/408 |
| 2005/0036722 A1 * | 2/2005 | Sato et al. | 384/192 |
| 2005/0191474 A1 * | 9/2005 | Gunn | 428/212 |
| 2006/0120644 A1 * | 6/2006 | Smith | 384/276 |

FOREIGN PATENT DOCUMENTS

| | | |
|---|---|---|
| DE | 3524761 A1 | 1/1987 |
| DE | 4220327 C1 | 6/1993 |
| DE | 295 12 317 U1 | 11/1995 |
| DE | 20 2005 005 829 U1 | 7/2005 |
| DE | 20 2004 013 251 U1 | 2/2006 |
| DE | 10 2004 041 084 A1 | 3/2006 |
| JP | 05149324 A * | 6/1993 |
| WO | WO 89/02542 | 3/1989 |

* cited by examiner

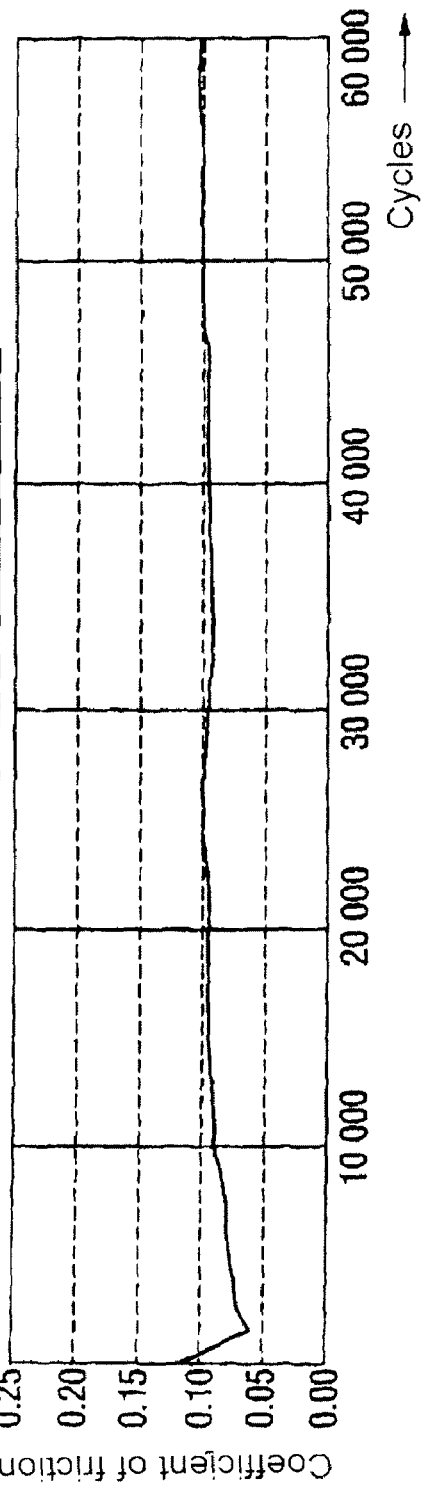
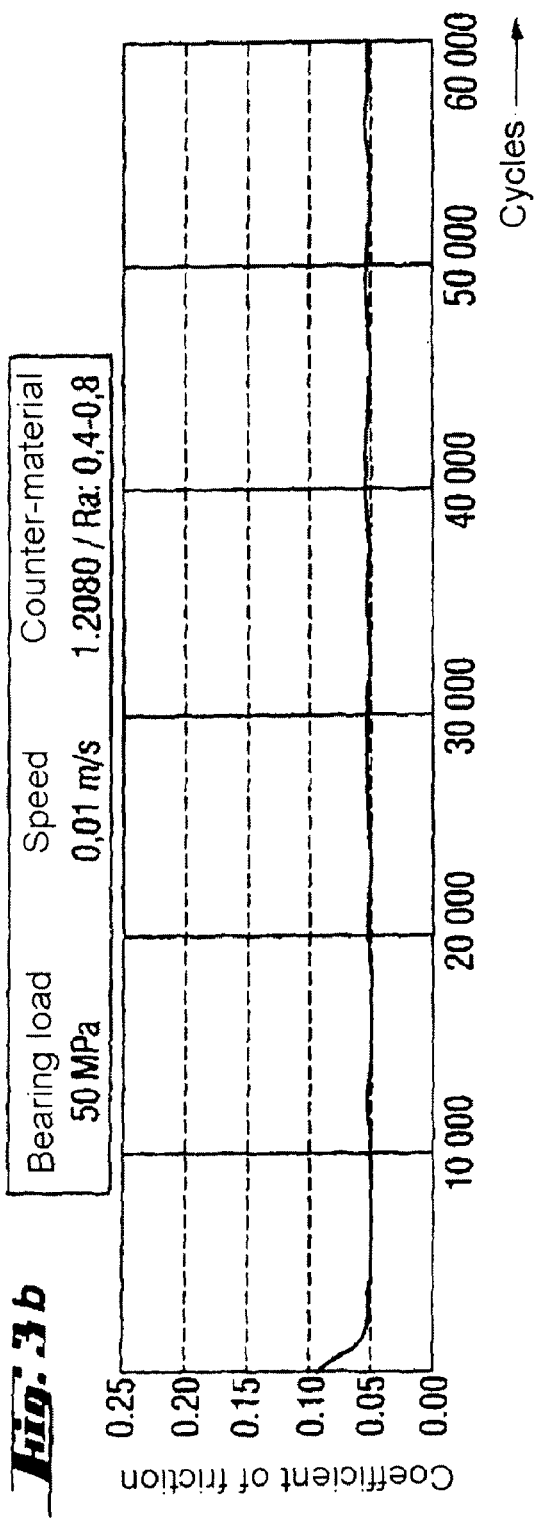

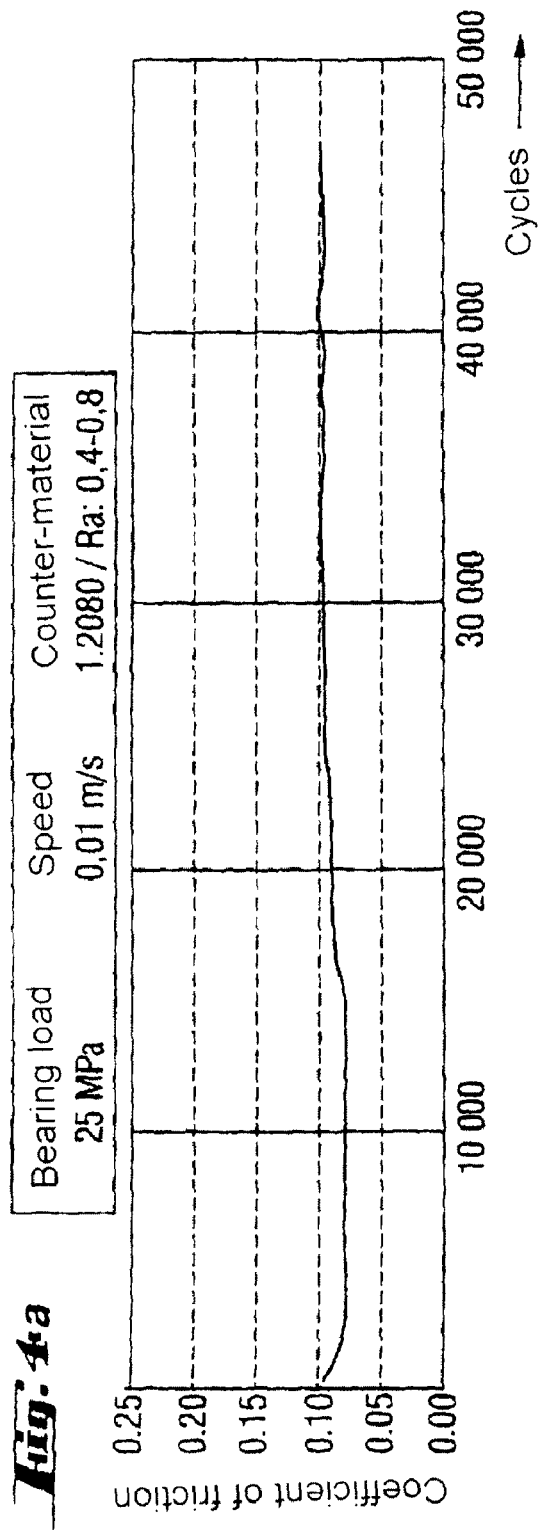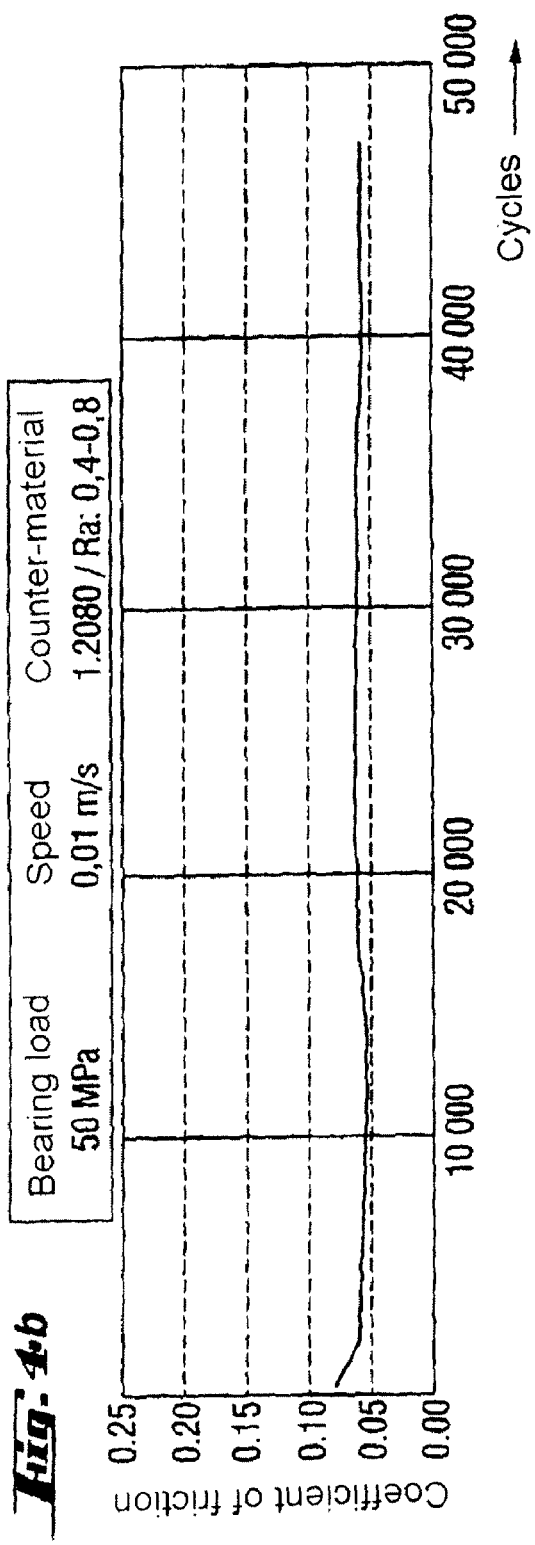

UNIVERSAL JOINT BEARING WITH PLASTIC OUTER RING AND PROCEDURE FOR ITS PRODUCTION

RELATED APPLICATIONS

This application claims priority to German Patent Application 10 2006 043 065.4-43, filed Sep. 14, 2006; German Patent Application 10 2006 042 999.0-43, filed Sep. 14, 2006 and German Patent Application 10 2007 008 584.4-12, filed Feb. 15, 2007.

BACKGROUND OF THE INVENTION

1. Technical Field

The invention relates to an outer race for a rocker bearing or such a rocker bearing in which the outer race has an internal sliding layer and an external support layer, and in which the sliding layer and the support layer are formed from a wound compound fiber material. The invention also relates to a method for producing such an outer race, in which a sliding layer and a support layer of fibers impregnated in synthetic resin are wound on to a winding mandrel and outer races are formed from the winding body thus produced after hardening.

2. Related Art

Such a method is disclosed, for example, in DE 42 20 327. In the method disclosed there for producing rocker bearings, a winding core is used consisting of an alternating arrangement of moulded rings for forming the pan-shaped inner profile of the outer race and separating rings for forming the end faces. Synthetic resin impregnated PTFE and/or high strength fibers, wound onto the winding core, are proposed as the sliding layer material. After the winding body thus formed is hardened, and after material is removed from the outer periphery, the outer races and separating rings can be pulled off the shaft. In this method the moulded rings remain in the outer race after being pulled off the shaft, and form the inner race of the bearing. The advantage of this is that no bearing play can be set due to the production conditions and that the outer race tightly encloses the moulded ring and inner race respectively. Such a bearing tends to wear very quickly.

There are many other known methods in which the outer race and inner race are produced separately and are subsequently connected together. With these methods there is always the question of how the outer race and inner race should be joined together. DE 84 00 958 U1 proposes, for example, designing the outer race of the radial rocker bearing so that on one end face it has axially directed sprung webs which are deformed when the bearing is inserted in a housing bore, with the result that some of the outer race bears with pre-tension against the surface of the previously inserted ball and socket mounted therein. Here too there is the disadvantage that the bearing play can only be roughly set in this manner. Furthermore, the load bearing capacity of the bearing is not limited to the optimum degree due to the isolated elastic webs around the periphery.

WO 89/02542 discloses an outer race consisting of two tin pots pressed and/or welded into each other, between which the inner race is inserted. In this case the cavity enclosed between the tin pots of the outer race and the inner race is then filled with plastic. Just as in DE 42 20 327, no bearing play can be set here either. Moreover, the production process is expensive and the production accuracy small.

To solve the problem DE 20 2004 013 251 U1 and DE 10 2004 041 084 A1 propose an outer race composed of two rings. The two races are connected positively together on the end face according to DE 20 2004 013 251 U1. Either metal or ceramic is proposed as material for the outer race. In the case of DE 10 2004 041 084 A1 the rings of the split outer race are fixed radially and axially by means of a wound housing. A compound fiber material, among other things, is proposed as the material for the housing.

A further development of the method disclosed in DE 42 20 327 is disclosed in DE 295 12 317 U1. Here the winding core is further developed to the extent that the separating rings each have two opposing axially directed projections. These projections form the shape for insertion grooves in the formed outer races, which are dimensioned so that the moulded ring can be removed from the hardened outer race by rotation, whereupon the actual inner race can be inserted. Although it is possible by this method to set the bearing play individually, this method suffers from the disadvantage that the load cross-section of the outer race is reduced due to the insertion grooves. Moreover, the grooves form edges that run transversely to the direction of running, which edges may give rise to a lubricating film irregularity and hence to inadequate bearing lubrication. Finally, the risk of contamination is increased here.

DE 20 2005 005 829 relates to injection moulded bearing housings or bearing bodies of plastic in which the bearing body or bearing housing is at the same time used as a mould for the corresponding counter-rotating bodies. Just as in the case of DE 42 20 327, the advantage of this is that no bearing play can be set in this method.

DE 35 24 761 A1 points in a different direction in that it proposes an outer race which is split at one point and on whose inner face is cast a sliding bearing by means of a tool ring as a casting. To remove the tool ring, then insert the inner race, the outer race is pulled apart on the parting line and therefore bent upwards.

All the above-mentioned methods suffer the disadvantage either that the bearings cannot be produced with sufficient accuracy and are therefore produced with inadequate properties, or that the production methods in most cases require a plurality of consecutive process steps and the processing of different materials, which render the production process complicated and expensive and may limit the durability of the bearings.

The object of this invention is to overcome such disadvantages.

SUMMARY OF THE INVENTION

The parting line provided according to the invention and opening the outer race does not serve to remove a tool or moulded ring from the mould, unlike the prior art, but merely for assembly, i.e. for subsequent insertion of an inner race. In contrast to the outer races of prior art, with cast sliding layer, the sliding layer of the outer race according to the invention is provided with a reinforcing element and has a better adhesive bond to the support layer which together ensure improved stability of the bearing. According to the invention is made of the elasticity and material tension of the wound composite fiber material resulting from the production method. For it has been established that bearing races produced by the winding technique have a sufficiently high residual stress that acts in the circumferential direction and ensures that the parting line re-closes automatically.

In the method according to the invention the sliding layer and the support layer are therefore wound by simple means onto a cylindrical winding mandrel. This can be achieved by winding the sliding layer either out of an individual thread or an individual fiber, a bundle of threads or fibers, or out of a prefabricated fabric or knitted fabric(pre-preg), or by placing it around the winding mandrel. The tubular winding body thus produced, with a circular cross-section, is removed from the mould after the plastic matrix has set. A cylindrical outer race isolated from this, e.g. by sawing off, is provided with exactly one parting line opening it, which then closes because of the residual stress of the wound race material. The parting line preferably runs in a plane which encloses the cylindrical axis of the race, so that the elastic force is perpendicular to the two end cutting faces and does not result in any relative displacement of the open race ends. In an alternative embodiment the parting line runs in a zigzag pattern or irregularly.

Although the cross-section of the race is no longer perfectly circular after closing the parting line, when the latter has a final cutting width, this is not a disadvantage because according to the invention it is re-machined, at least on the inside. The sliding layer material is removed from the race so that the sliding layer is given a partially spherical inner contour for receiving an inner race with a surface of the desired dimension in the shape of a spherical segment. This enables the required bearing play to be set simultaneously. The closed parting line and the precise re-machining ensure that the sliding surface is given a maximum supporting cross-section throughout the circumference.

The outer race is generally also re-machined on its outside, this depending on the ratio of the race circumference to the cutting width of the parting line.

The sliding layer of the outer race preferably has as a reinforcing element a plastic thread with polyester filaments and with worked in PTFE particles. The method of the invention is further developed correspondingly.

If the sliding layer is wound indirectly or directly from a plastic thread with polyester filaments and with worked in PTFE particles—indirectly or directly in the above-mentioned sense that the sliding layer is found either from an individual plastic thread, a bundle of plastic threads or a knotted fabric or fabric formed from plastic threads-, this provides much improved re-machinability compared to compound fiber materials of prior art.

Although the use of PTFE (polytetrafluoroethylene) or graphite is known as a solid lubricant for self-lubricating sliding layers, these substances are either added to the plastic matrix in particle form or, in the case of PTFE, intertwined in the form of a filament with other plastic filaments to form the plastic thread of the sliding layer. As is well known, polyester is generally used in most cases as the thread plastic. Typically two polyesters and one PTFE filament are intertwined to form a thread in this case.

However, tribological and mechanical properties could not yet be obtained satisfactorily for all applications. For PTFE is highly reaction inert because of the strong intermolecular binding of the carbon and fluorine atoms, and has a very low surface tension. Therefore no chemical reaction, or no appreciable reaction, takes place between the plastic matrix and the PTFE. It was established, particularly when the prior art plastic threads of two polyester filaments and one PTFE filament were used, that the PTFE filaments only reached a very low adhesion to the plastic matrix. Consequently the sliding layers of prior art could not be re-machined mechanically without difficulty, or not at all. In most cases the result was delamination of the sliding layer and deterioration in the tribological properties and in the wear resistance of the siding layer.

This problem is solved by means of a sliding layer based on the plastic thread according to the invention with polyester filaments and with PTFE particles worked, in particular spun into them. This thread also has the advantage over the twisted fibers of prior art of greater variability in the content of the individual components of the thread or fiber, particularly its PTFE content. Therefore its properties can be modified much more precisely even during the production of the plastic thread. Due to the fact that the PTFE particles do not adhere together, unlike the PTFE filament, i.e. due to the PTFE particles arranged and anchored randomly inside the polyester filaments, the plastic thread has a roughed up appearance and a better adhesive bond is achieved between the plastic thread and the plastic matrix. Finally, the binding of the PTFE particles in the plastic thread reinforces the mechanical retention of the same, due mainly to positive mechanical engagement.

The sliding layer may therefore be satisfactorily machined mechanically, i.e. with cutting. The use of the plastic thread with PTFE particles in the sliding layer is therefore particularly suitable for the outer races according to the invention, in which sliding layer material on the inside of the winding body is not removed until later. In addition to the improved machinability, improved wear values, particularly in terms of depth wear, are also achieved because of the improved binding of the PTFE particles.

Such a sliding layer according to the invention also has advantages over the prior art sliding layers with PTFE particles as a solid lubricant in the plastic matrix. As a solid lubricant in the plastic matrix PTFE also has a strength reducing action, thus impairing the tribological properties at high load and in an aqueous environment, and while the PTFE particles in the plastic matrix are in most cases distributed inhomogeneously because of the different material thickness, the distribution of the particles throughout the sliding surface is highly homogeneous since the particles are solidly bound in the fiber/thread which extends throughout the thickness of the sliding layer. Due to the improved homogeneity and improved mechanical binding, improved tribological properties are also ultimately achieved. This applies to both dry running and its use in an aqueous environment.

It has proved advantageous for the proportion of the PTFE particles by weight in the plastic thread to be between 2% by weight and 60% by weight, and the proportion of the polyester filaments in the plastic thread to be between 40% by weight and 98% by weight. With a higher proportion of PTFE particles the binding of the particles to the fibers is reduced, as is the loading capacity of the sliding layer. In particular preference the proportion of the PTFE particles by weight in the plastic thread is between 2% by weight and 40% by weight, that of the polyester filaments between 60% by weight and 98% by weight, and in particular preference the proportion of the PTFE particles by weight is between 30% by weight and 36% by weight, while the proportion by weight of the polyester filaments by weight in the plastic thread is between 64% and 70% by weight. In this composition range the ratio of durability to the tribological properties of the sliding layer is set to the optimum for most sliding partners considered.

In this weight ratio the adhesion between the plastic thread and the plastic matrix remains sufficiently high to achieve good machinability. On the other hand the proportion of the PTFE particles is sufficiently high to achieve a good sliding characteristic.

As already noted, the reinforcing element of the compound fiber material may have the structure of a fabric or knitted fabric produced from the plastic thread, or may have the smooth winding structure of an individual thread or a plurality or parallel or bundled threads, which structure is typically produced by winding on a winding core.

In this case particular attention is paid to the advantages of the plastic thread used according to the invention. For because of its roughness, it is eminently suitable for producing sliding layers in the winding process, where the thread is first guided through an impregnating tank filled with synthetic resin, and in doing so is sufficiently impregnated by the synthetic resin. The winding process offers the advantage that a certain winding structure can therefore be produced to match the intended application of the sliding element or the sliding layer. For instance the fibers may be positioned in the fiber composite so that it withstands the stresses as far as possible, i.e. according to the force and tension distribution.

The sliding layer preferably has a plastic matrix of synthetic resin and, in particular preference, of epoxy resin.

In addition to the PTFE particles spun into the plastic thread, PTFE particles are preferably also added to the plastic matrix in many applications. The proportion of PTFE particles in the plastic matrix is here a maximum of 40% by weight.

Alternatively the plastic matrix may contain graphite particles. The proportion by weight of the graphite particles in the plastic matrix is preferably between 1 and 40% by weight.

Furthermore, both PTFE particles and graphite particles may also be added to the plastic matrix, the total proportion by weight of these particles being preferably no more than 40% by weight.

Just as the sliding layer, the support layer is formed from a wound composite fiber material. The fiber reinforced plastic of the support layer consists advantageously of a plastic matrix with a glass fiber as reinforcing element, the plastic matrix preferably consisting of synthetic resin, and in particular preference also of epoxy resin.

Just as for the plastic matrix of the sliding layer, epoxy resin is also suitable as a plastic matrix for the support layer due to excellent adhesion properties, mechanical and dynamic properties. Because of its molecular structure epoxy resin also has very good moisture resistance and comparatively little tendency to swell. Because the same plastic matrix is used in the sliding and support layer, the binding forces between the sliding layer and the support layer are also increased. The reinforcing element of the support layer also preferably has the structure of a fabric or knitted fabric produced from the glass fiber, the fabric being wound around a winding core, or in another preferred embodiment has a winding structure which is produced by winding the glass fiber or a glass fiber bundle onto a winding mandrel.

If the sliding layer and support layer are deposited in succession on a winding mandrel in the winding process, this increases the efficiency of the production of the compound bearing material.

In particular preference the parting line is designed in the shape of a wedge with a cross-section reducing radially inwards.

In this case the cutting edge with which the parting line is produced is selected so that both cutting end faces bear fully against each other after the parting line is closed. The lip angle of the parting line cut must therefore correspond to an angle segment of the circle formed by the outer race.

The parting line can be produced by means of forming cutters, a saw blade and the like, or by means of water jet cutting or laser jet cutting. Due to the high internal tool tension, water jet cutting was found to be preferable from the processing engineering viewpoint. Moreover, no tool wear, which may result in short tool lives particularly in the case of composite materials, occurs in this method. The parting lines thus produced all have a "finite cutting width". A parting line without a cutting width, and therefore without impairing the circular shape of the race, can also be produced by a known method by fracture splitting or so-called "cracking".

THE DRAWINGS

Further objects, features and advantages of the invention are explained in the following with reference to exemplary embodiments with the aid of the drawings.

Figure 2A:
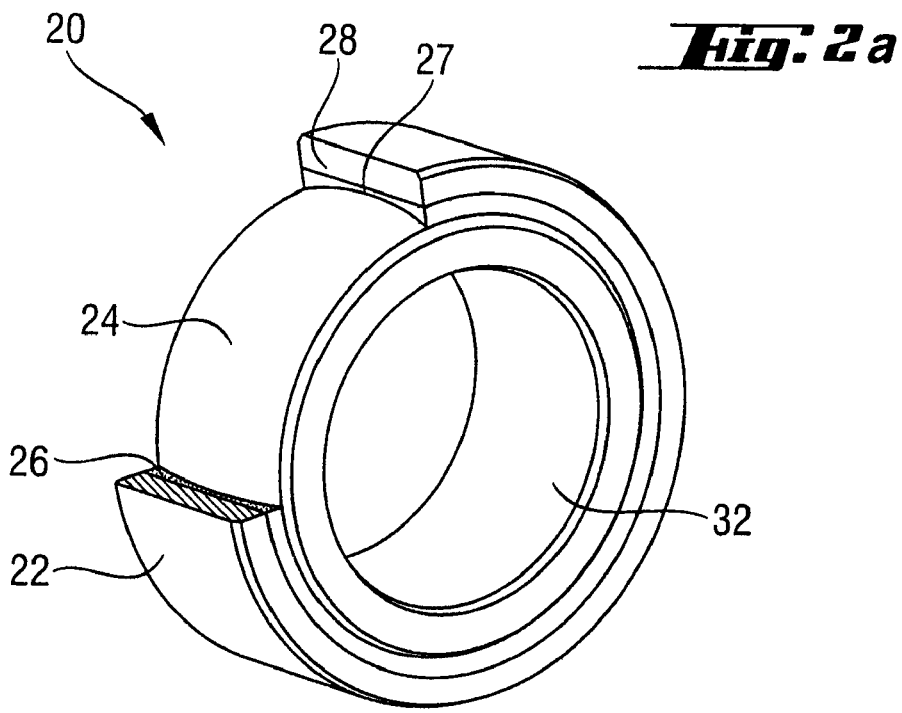
Figure 5:
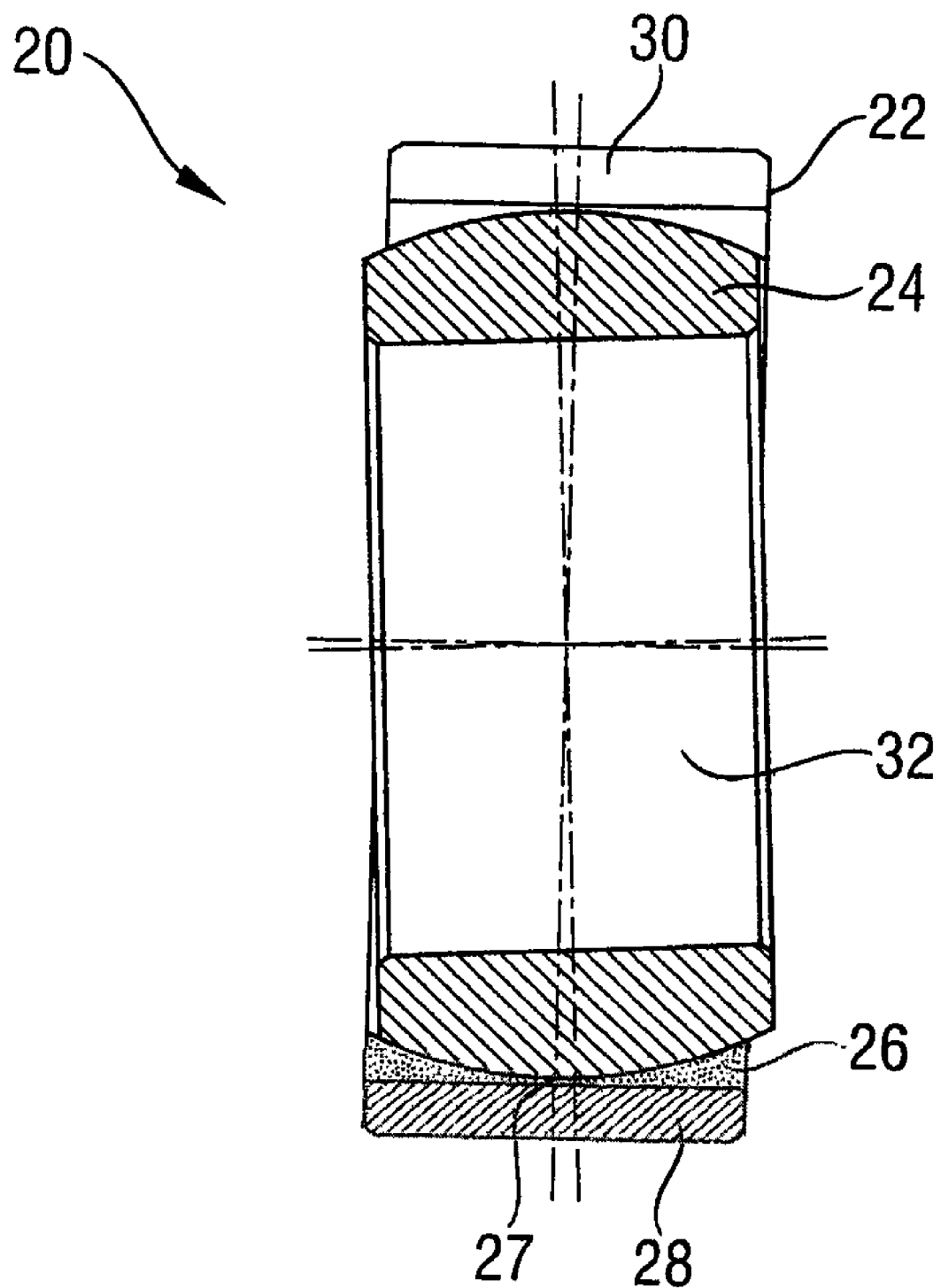

FIG. 1 shows a cross-section through the plastic thread used in the sliding layer according to the invention;

FIGS. 2a, b show a perspective representation of the rocker bearing according to the invention, for an illustration in partial section and in a full representation;

FIGS. 3a, b show two graphs of the coefficient of friction of a radial sliding bearing according to the invention under different loads in dry running;

FIGS. 4a, b show two graphs of the coefficient of friction of a radial sliding bearing according to the invention under different loads in wet running, and FIG. 5 shows a cross-section through the rocker bearing according to the invention.

DETAILED DESCRIPTION

Plastic thread 10 used according to the invention for the sliding layer of the outer race as a reinforcing element is shown in FIG. 1 in an enlarged sectional representation. This consists of polyester filaments 12 orientated along the thread and contains as a second component PTFE particles 14 which are spun into polyester filaments 12 in a random arrangement. During the production process there are very many possibilities of modifying the properties of the thread. For example, the number of polyester filaments 12 per thread 10 can be varied according to the application, but here attention should be paid to ensuring an adequate positive engagement with the bound in PTFE particles 14.

The weight ratio of polyester filaments 12 to PTFE particles 14 may also be varied. However, it has proved particularly preferable, in terms of adhesion, friction and sliding characteristic, if the proportion of the PTFE particles 14 in the plastic thread is between 30 and 36% by weight and the proportion of polyester filaments 12 by between 64 and 70% by weight.

The titre of plastic thread 10 according to FIG. 1 has a preferred value of between 100 dtex and 600 dtex, and in particular between 400 dtex and 550 dtex (1 dtex=1 g/1000 m of yarn).

Because of these parameters a sufficiently solid binding of PTFE particles 14 into polyester filaments 12 is achieved, which provide adequate support in terms of wear resistance and mechanical machining. The sliding layer therefore retains its good tribological properties even when it is remachined, for example, by cutting grooves or drilling.

PTFE particles 14 are also distributed homogeneously over the thread length and hence throughout the woven, knitted or wound structure of the reinforcing element. Thread 10 can be excellently wetted and hence well processed because of the partially loose composite that forms a multiplicity of ducts. The cross linkage of the matrix penetrating the depth of the ducts guarantees improved adhesion.

Plastic thread 10 generally appears roughened or fibrous, as does the finished siding layer. This optical roughness is due to the randomly orientated PTFE particles 14 and is not associated with an increased coefficient of friction due to their sliding characteristic. The sliding characteristic of the sliding layer according to the invention is generally of the same good quality in different applications even over a long period of stress, as will become clear with reference to the graphs in FIGS. 3 and 4.

Figure 2B:
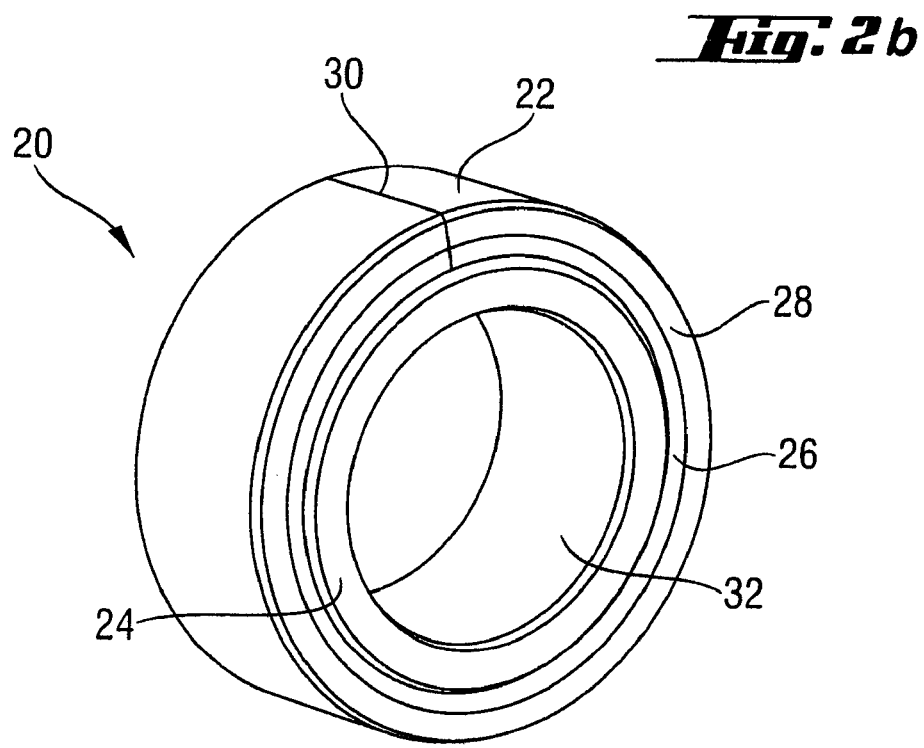

FIGS. 2a, 2b and 5 show rocker bearing 20 according to the invention in different views. It consists of an outer race 22, which incorporates an inner race 24, i.e. surrounds it continuously with positive engagement. Outer race 22 has a sliding layer 26 on its inside and a support layer 28 on its outside.

Both layers 26, 28 are deposited in succession in the winding method on a winding mandrel to produce a typical winding structure. The winding represents an extremely simple, low cost production method for rationally symmetrical sliding elements. The structures of both layers may be adapted individually and simply to the mechanical requirements of the bearing. Besides simple cross structures of individually deposit threads, the threads may also be wound grouped into bundles, enabling the corresponding layer to be wound more quickly can also be produced by different methods.

While different reinforcing elements, namely the plastic thread shown in FIG. 1 on the one hand, and glass fibers in support layer 28 on the other hand, are used in sliding layer 26 and support layer 28, the plastic matrix in both layers is preferably the same, namely epoxy resin. This is ideal because of its excellent adhesion and mechanical properties. Alternatively, however, unsaturated polyester resins or vinyl ester resins may also be used.

In addition to the proven glass fibers, carbon fibers, for example, may also be considered as reinforcing elements for support layer 28. The thread may also be pre-processed initially into a fabric, knitted fabric or other textile.

In many applications solid lubricants, for example graphite particles or PTFE particles, are added to the plastic matrix of sliding layer 26. Support layer 28, on the other hand, generally has a plastic matrix without the addition of additional components.

Sliding layer 26 has a spherical surface profile on its inwardly facing side, which profile is a supplement to the spherical segment formed by inner race 24. This surface profile is produced after setting of the finished winding body, separation of a race and parting of the race along parting line 30 by drilling or turning. Here very high accuracy is achieved because of the above described properties of the thread used according to the invention as a reinforcing element, and does not impair the tribological properties of the sliding layer. In particular the desired bearing play may be set very accurately in this manner. Sliding layer 26 is designed radially thinner than support layer 28 because of the profile in vertical region 27. Therefore consideration must already be given to the geometry of rocker bearing 20 during the winding phase and a sufficiently thick sliding layer 26 must be applied.

Inner race 24 is then inserted in the finished outer race 22, the latter being spread in the region of parting line 30. This spreading may be achieved by in inner race 24 or, in support of this, by pulling on outer race 22. The outer race then snaps elastically together because of its residual stress, and permanently fixes the inner race. Parting line 30 closes.

Inner race 24 has, as usual, a greater axial length than outer race 22, so that when both races are aligned coaxially, if projects symmetrically from it on both sides. Inner race 24 has, as is also usual, a central through hole 32 for receiving a shaft to be stored.

FIGS. 3a, b show the behaviour of the coefficient of friction between a radial sliding bearing bush according to the invention and a steel shaft stored in it, which coefficient has been determined in a dry run test. In this case the shaft was turned back and fore with a roughness of $R_a$=0.4 to 0.8 by an angle of 45° and at a peripheral speed of 0.01 m/s. The specific load radially applied here was 25 MPa in the case of the upper measuring curve 25 (FIG. 3a). In the case of the lower measuring curve (FIG. 3b), a radial specific load of 50 MPa was applied under otherwise identical conditions.

The results show that a minimum coefficient of friction was achieved after a short run-in phase of approximately 2000 cycles, which in the case of the higher load throughout the test time of 60000 cycles was approximately constant at 0.05. In the case of the lower load the coefficient of friction rose after reaching the minimum, initially slowly, of approximately 0.06, after a period of approximately 15000 cycles, but showed a saturation of approximately 0.1. The slightly increased coefficient of friction in the case of the lower load is consistent with the rate of wear. This was 25 MPa at a value of 5.1 μm/km (sliding distance), while in the case of the higher load of 50 MPa it reached a value of 10.7 μm/km. Because of the generally increased wear under the higher load of 35 μm, compared to 17.5 μm under the lower load, more solid lubricant is released, which reduces the coefficient of friction. A significant smoothing of the pressurised sliding bearing surface was therefore also established, particularly in the case of the higher load.

FIGS. 4a and 4b show the behaviour of the coefficients of friction of the shaft stored in a radial sliding bearing bush, under wet running conditions, i.e. in water. The test conditions were otherwise the same as above. Here too it is shown that the coefficient of friction is lower, in the case of the higher load of 50 MPa, lower graph in FIG. 4b, than in the case of the lower load of 25 MPa, upper graph, FIG. 4b. After a slightly extended run-in phase compared to dry running at 25 MPa, the coefficient of friction attained approximately the same value of 0.1. At 50 MPa a slightly higher mean value of 0.06, compared to dry running, was determined. Here too a lower rate of wear at 25 MPa of 8.1 μm/km and hence a lower wear of 21.25 μm, throughout the test time of approximately 47000 cycles, was observed compared to 27.2 μm/km and 70 μm respectively at 50 MPa. Again a significant smoothing of the pressurised sliding bearing surface was established, mainly in the case of the higher load.

In both load cases, however, no significant detachment of the sliding layer was observed. The wear values were far below those of the plastic sliding elements of prior art.

The above results and conclusions can be transferred to the rocker bearing according to the invention if an inner race of steel or at least with a steel surface, preferably of a steel with a surface hardness of >120 HB, and in particular preference with a surface hardness of >180 HB, as a sliding partner for the outer race of composite fiber material with the fiber containing PTFE particles. Alternatively pairings of the composite fiber material according to the invention with an inner race of ceramic or a metal ceramic material may also be considered.

The invention claimed is:

1. An outer race for a rocker bearing with an internal sliding layer and an external support layer, wherein the sliding layer and the support layer are formed from a wound composite fiber material, whereby the outer race has exactly one parting line and wherein the sliding layer contains a plastic thread as the reinforcing element, which has polyester filaments into which are spun discrete PTFE particles which do not adhere together.

2. The outer race according to claim 1, wherein the plastic thread the proportion of discrete PTFE particles which do not adhere together is between 2 and 60% by weight, and the proportion of the polyester filaments is between 40 and 98% by weight.

3. The outer race according to claim 2, wherein the plastic thread the proportion of discrete PTFE particles which do not adhere together is between 30 and 36% by weight, and the proportion of the polyester filaments is between 64 and 70% by weight.

4. The outer race according to claim 1, wherein the sliding layer has a plastic matrix of synthetic resin.

5. The outer race according to claim 4, wherein the plastic matrix consists of epoxy resin.

6. The outer race according to claim 4, wherein the plastic matrix contains discrete PTFE particles which do not adhere together.

7. The outer race according to claim 1, wherein the parting line is designed in the shape of a wedge with a cross-section that reduces radially inwards.

8. A rocker bearing with an outer race according to claim 1 and with an inner race.

9. The rocker bearing according to claim 8, wherein the inner race has a steel surface with a surface hardness exceeding 120 HB.

10. The rocker bearing according to claim 9, wherein the inner race has a steel surface with a surface hardness exceeding 180 HB.

* * * * *